(12) United States Patent
Yang

(10) Patent No.: US 8,714,756 B2
(45) Date of Patent: May 6, 2014

(54) PROJECTOR HOLDER AND PROJECTOR SYSTEM HAVING THE SAME

(75) Inventor: Song-Ling Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 260 days.

(21) Appl. No.: 13/212,197

(22) Filed: Aug. 18, 2011

(65) Prior Publication Data

US 2012/0309229 A1 Dec. 6, 2012

(30) Foreign Application Priority Data

May 30, 2011 (CN) .......................... 2011 1 0142288

(51) Int. Cl.
*G03B 21/14* (2006.01)
*G03B 21/22* (2006.01)
*A47G 1/17* (2006.01)

(52) U.S. Cl.
USPC ...................................... 353/119; 248/309.4

(58) Field of Classification Search
USPC ............... 353/119, 122; 248/683, 467, 205.5, 248/309.4
See application file for complete search history.

(56) References Cited

U.S. PATENT DOCUMENTS

| 5,799,423 A * | 9/1998 | Malino ........................... 40/107 |
| 2007/0195294 A1* | 8/2007 | Willey et al. ................... 353/119 |
| 2010/0102182 A1* | 4/2010 | Lin ............................. 248/206.5 |

* cited by examiner

*Primary Examiner* — William C Dowling
*Assistant Examiner* — Ryan Howard
(74) *Attorney, Agent, or Firm* — Novak Druce Connolly Bove + Quigg LLP

(57) ABSTRACT

A holder to hold a projector includes a support. One side of the projector is capable of being attracted by a magnet. The support includes a base board and a supporting board connected to the base board. The base board is to be supported by a supporting surface. The support further includes a first magnet fixed on the supporting board to attract the side of the projector, for adjustably and magnetically supporting the projector on the supporting board.

10 Claims, 12 Drawing Sheets

PROJECTOR HOLDER AND PROJECTOR SYSTEM HAVING THE SAME

BACKGROUND

1. Technical Field

The present disclosure relates to projector holders and projector systems having a projector holder.

2. Description of Related Art

In projectors, lenses can be easily scratched and so must be protected. Many projectors are supported by a holder so that they may be placed on a horizontal surface such as a desktop. However, it may be desirable to place and aim a projector on a surface that is not horizontal. Conventional holders are not suitable for such demands.

It is therefore desirable to provide a holder capable of both protecting the lens of a projector when not in use and providing adjustable support for using the projector in a variety of conditions.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
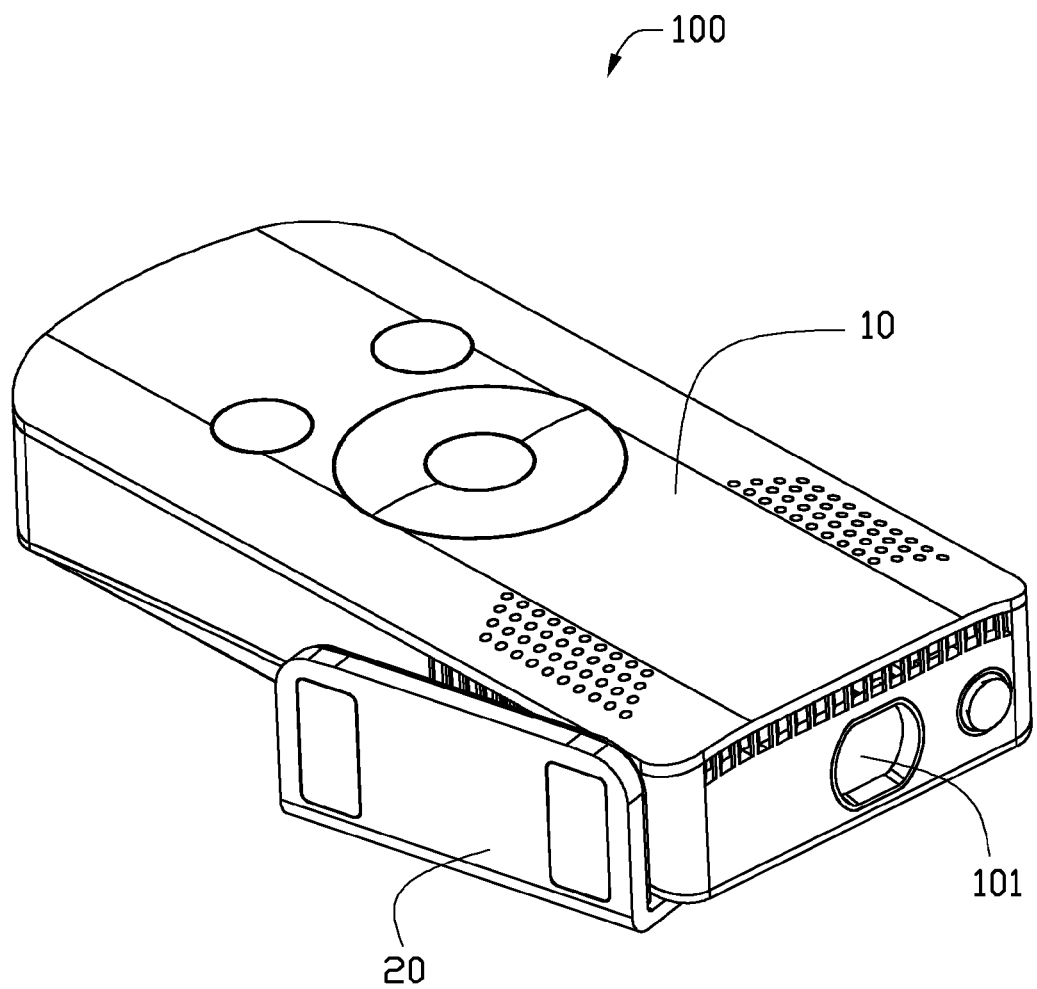
FIG. 1 is an isometric view of a projector system including a projector and a holder to hold the projector, in accordance with an exemplary embodiment.
Figure 2:
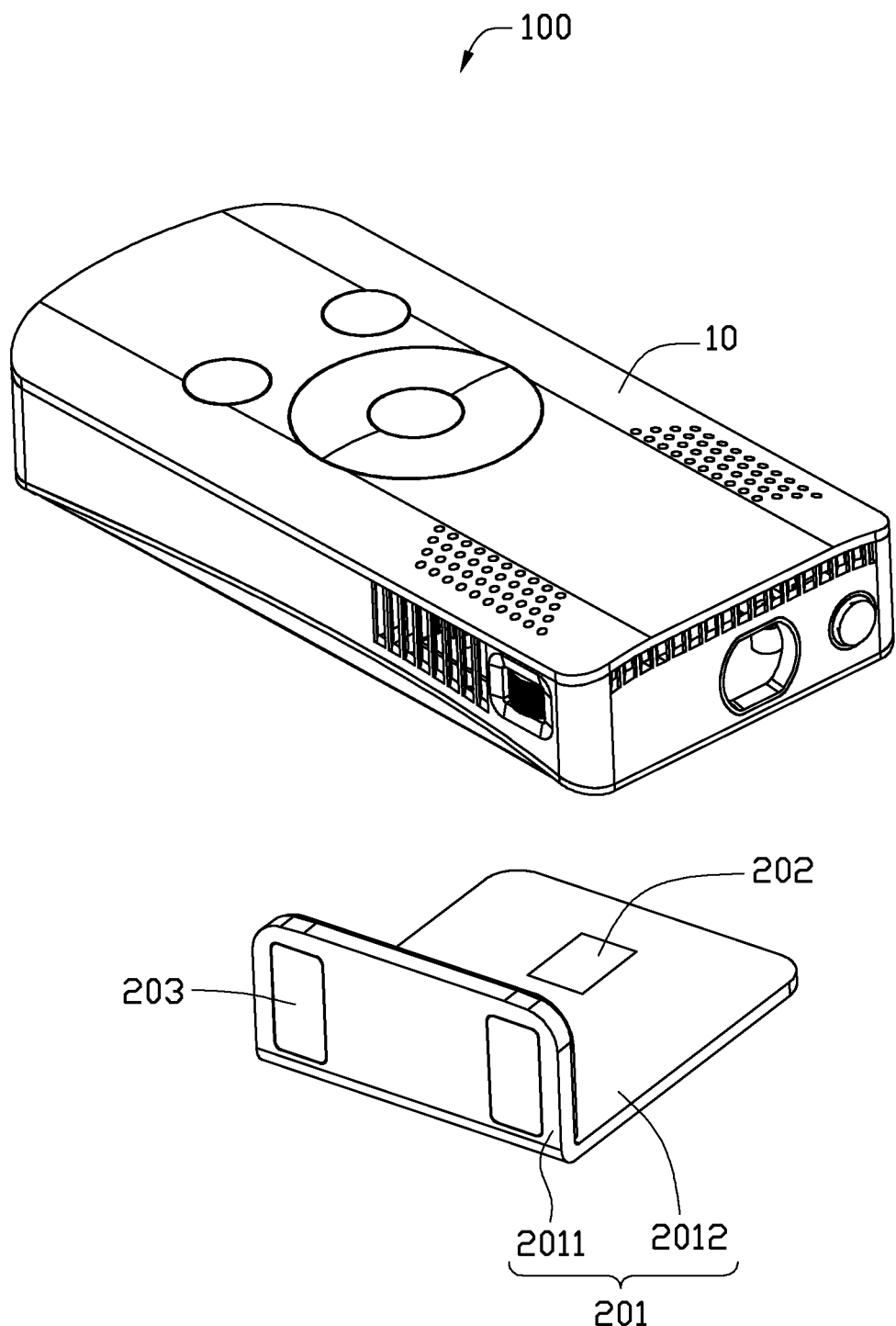
FIG. 2 is an isometric, exploded view of the projector system of FIG. 1.
Figure 3:
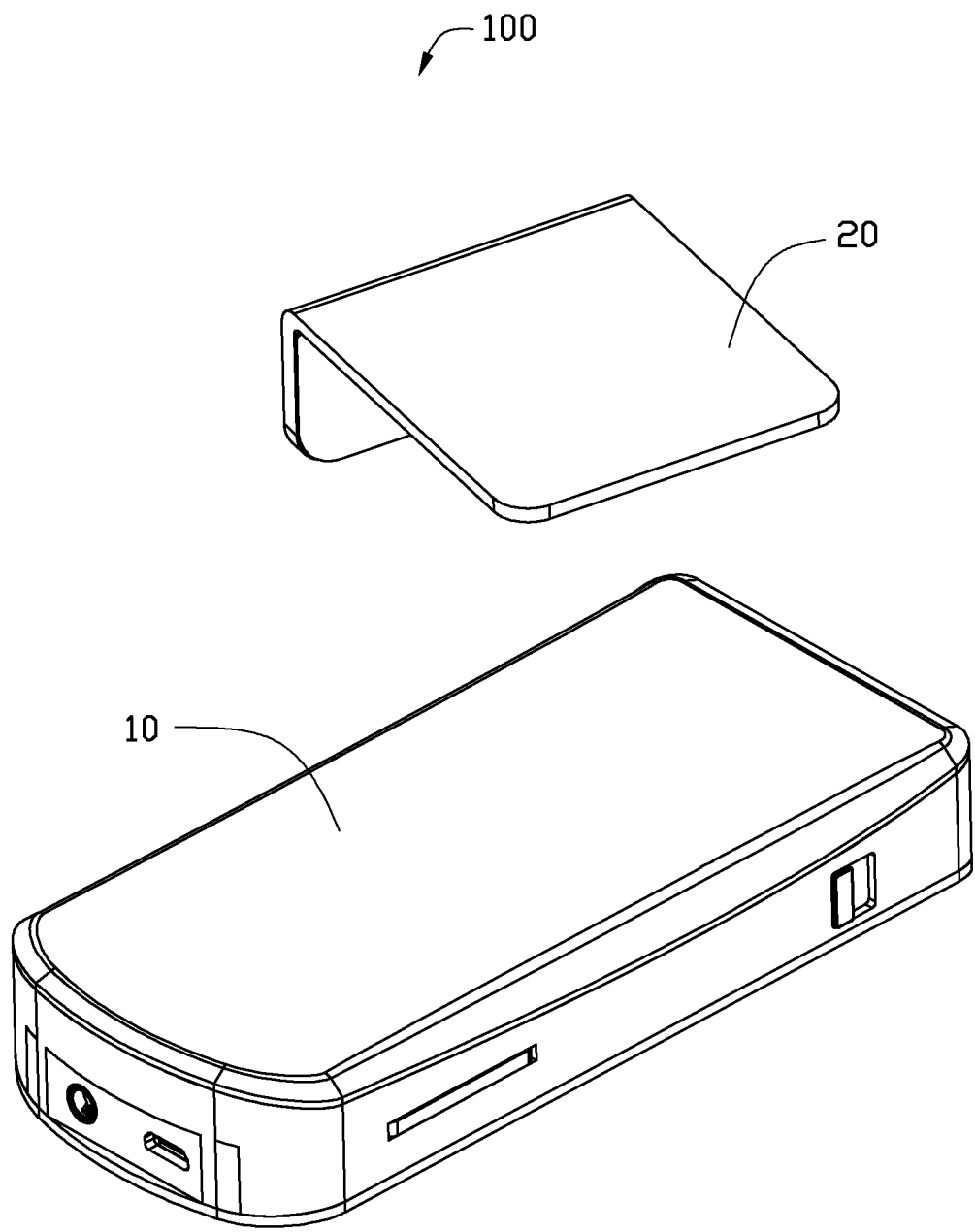
FIG. 3 is similar to FIG. 2, but viewed from another perspective.

Referring to FIGS. 1-3, a projector system 100 includes a projector 10 and a holder 20. The projector 10 is used to project images on a surface, such as a wall of a room. The projector 10 includes a projection lens 101. A side of the projector 10 can be attracted by a magnet, and the side may be made of ferromagnetic materials such as iron, cobalt, or nickel. The holder 20 is used to rotatably support the projector 10 on both horizontal and non-horizontal surfaces, such as desktops and walls.

The holder 20 includes a support 201 and a first magnet 202. The support 201 includes a base board 2011 and a supporting board 2012 protruding from one end of the base board 2011. The base board 2011 is to be supported by a supporting surface. The first magnet 202 is fixed on the supporting board 2012 to attract the side of the projector 10, for adjustably and magnetically supporting the projector 10 on the supporting board 2012. In this embodiment, the supporting board 2012 is substantially perpendicular to the base board 2011.

Figure 4:
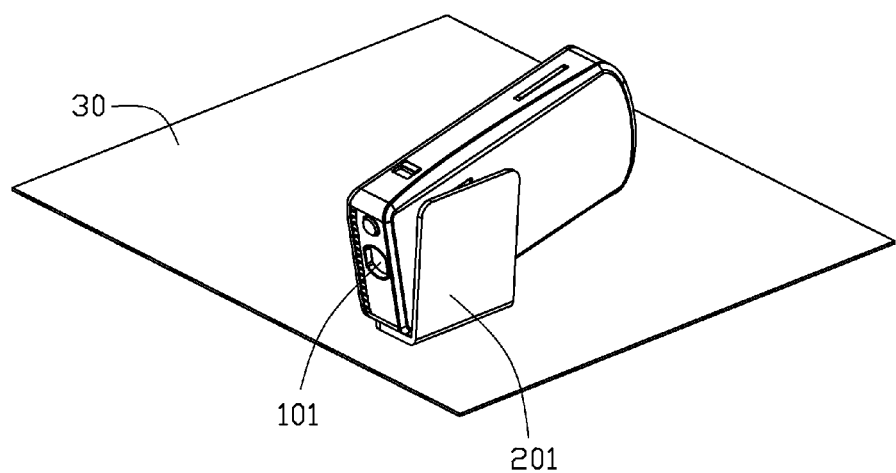
FIG. 4 is a schematic view showing the projector of FIG. 1 is supported on a horizontal supporting surface.

Referring to FIG. 4, in a first situation, the base board 2011 of the support 201 can be placed on and stay in contact with a horizontal supporting surface 30. The projector 10 is magnetically attracted to the supporting board 2012 by the magnet 202. The projector 10 can be rotated in a vertical plane defined by the supporting board 2012 to aim at a projection surface. The angle between the supporting board 2012 and the base board 2011 may not be limited to 90 degrees and can be varied according to need, as long as the angle can ensure that the support 201 can stably support the projector 10 when the projector 10 is attracted to the supporting board 2012 and the base board 2011 resides on a horizontal supporting surface.

Figure 5:
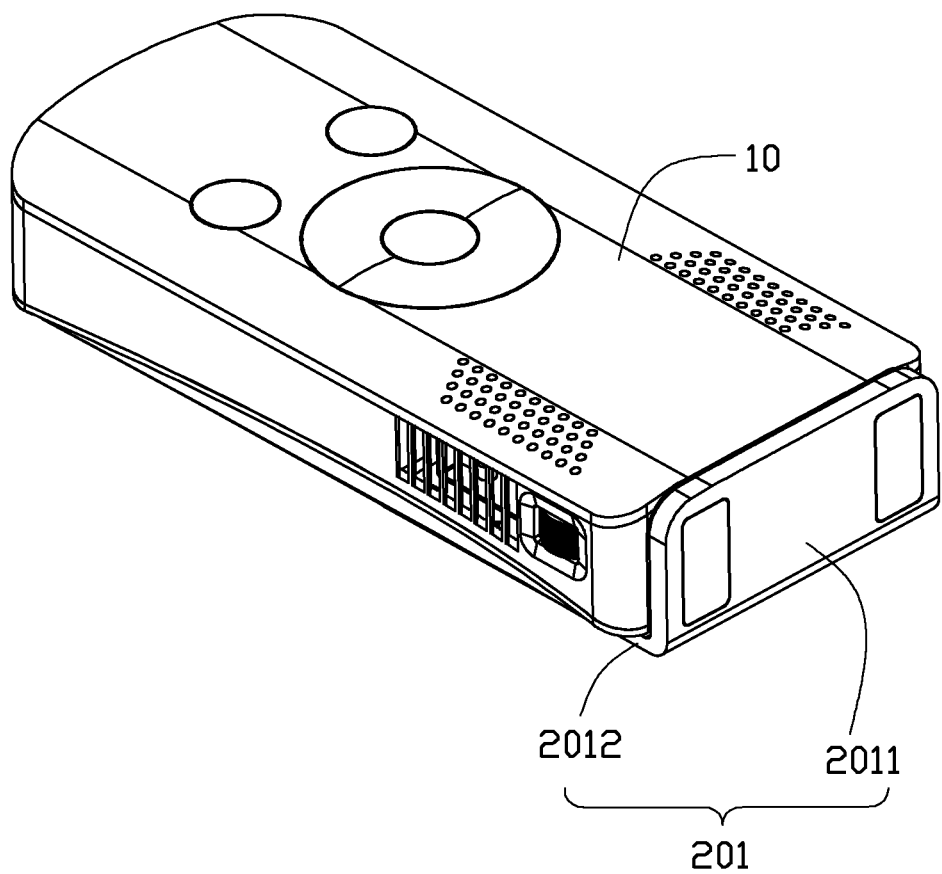
FIG. 5 is a schematic view showing a lens of the projector of FIG. 1 is shielded by the holder of FIG. 1.

Referring to FIG. 5, when the projector 10 is not in use, the support 201 can be rotated with respect to the projector 10 until the projection lens 101 is covered and protected by the base board 2011.

Referring again to FIG. 2, in this embodiment, the holder 20 further includes two second magnets 203 fixed on two ends of a side of the base board 2011 that is away from the supporting board 2012. When a supporting surface is made of ferromagnetic materials such as iron, cobalt, or nickel, the base board 2011 can be magnetically attracted to the supporting surface because of the two magnets 203. In an alternative embodiment, the number of the second magnet 203 can be varied according to need, for example, to just one.

Figure 6:
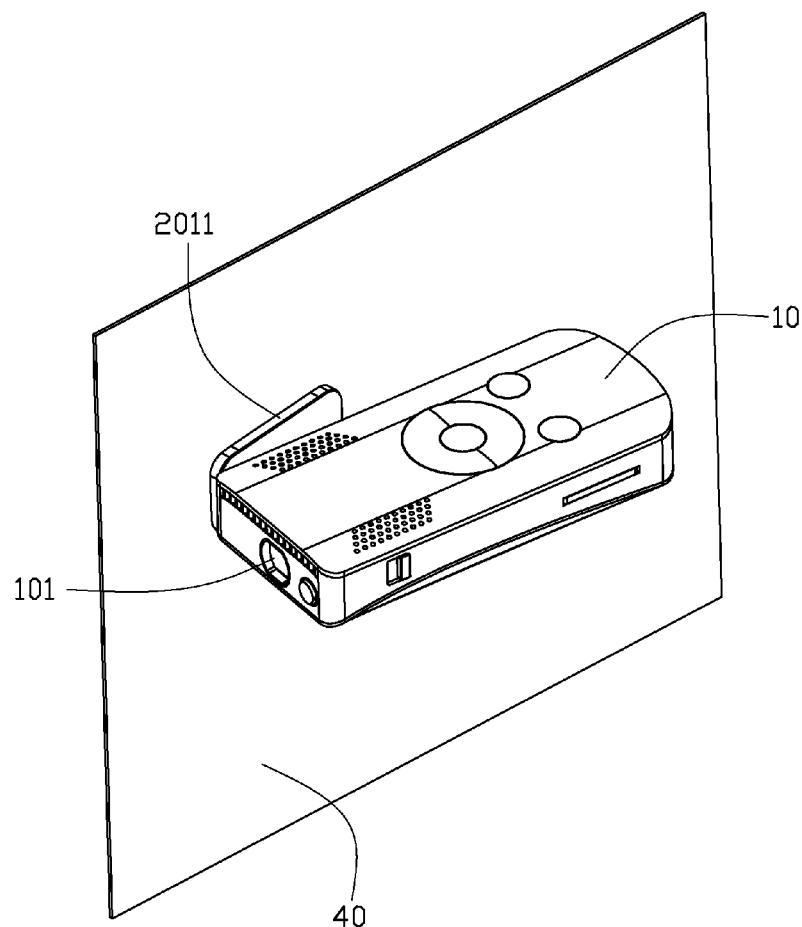
FIG. 6 is a schematic view showing the projector of FIG. 1 is attached to a vertical surface via the holder of FIG. 1.
Figure 7:
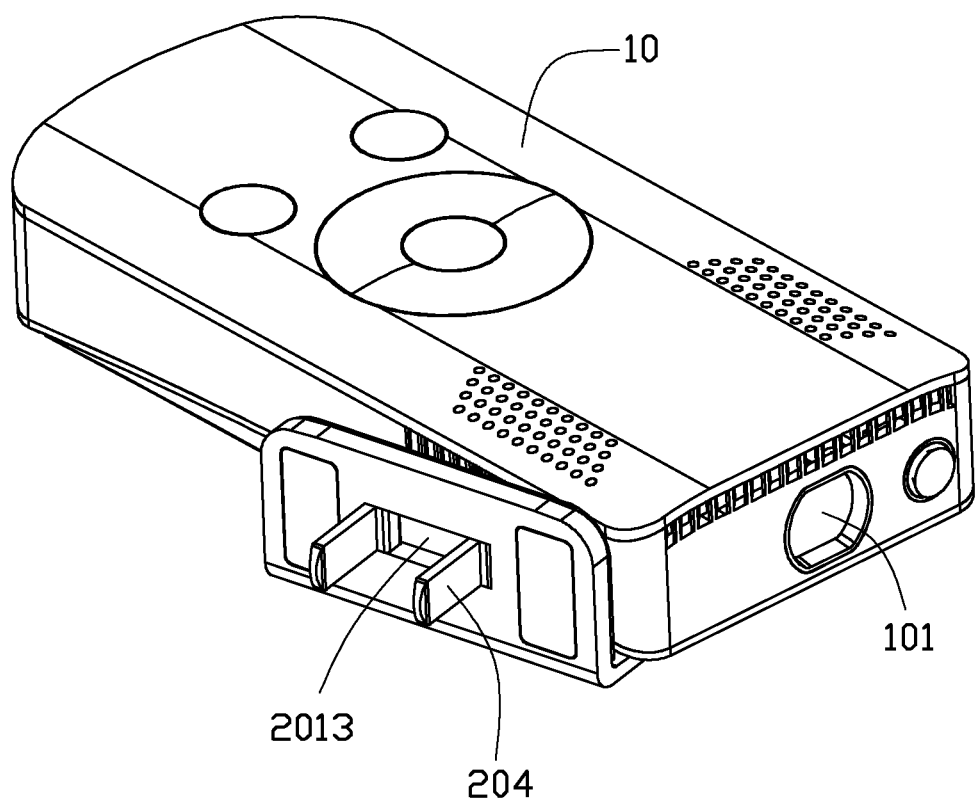
FIG. 7 is an isometric view of a projector system including a projector and a holder to hold the projector, in accordance with another exemplary embodiment.
Figure 8:
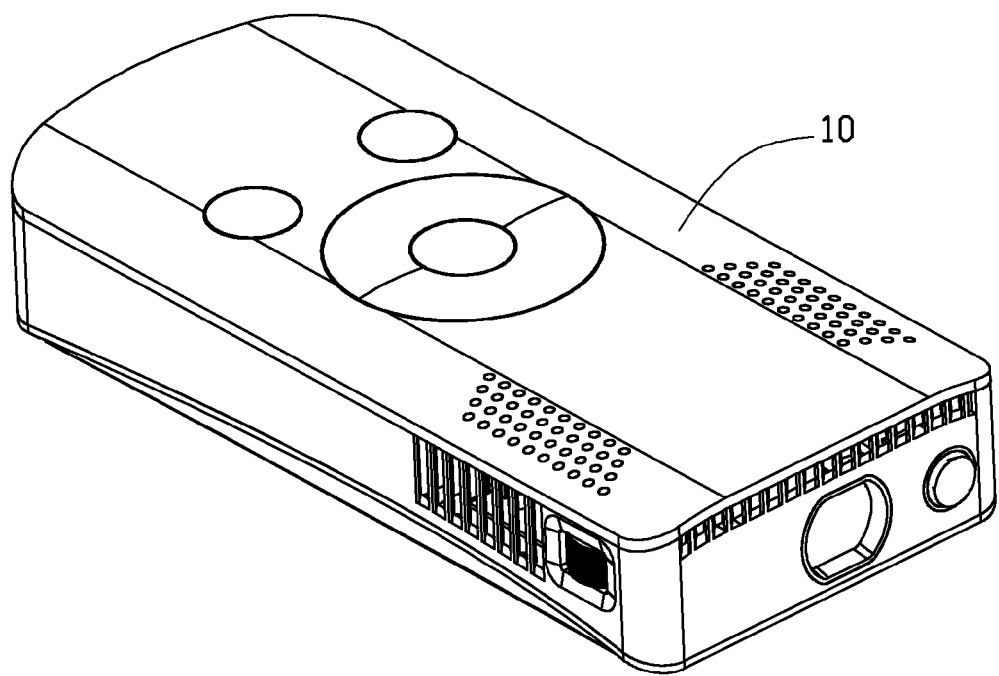
FIG. 8 is an isometric, exploded view of the projector system of FIG. 7.
Figure 8:
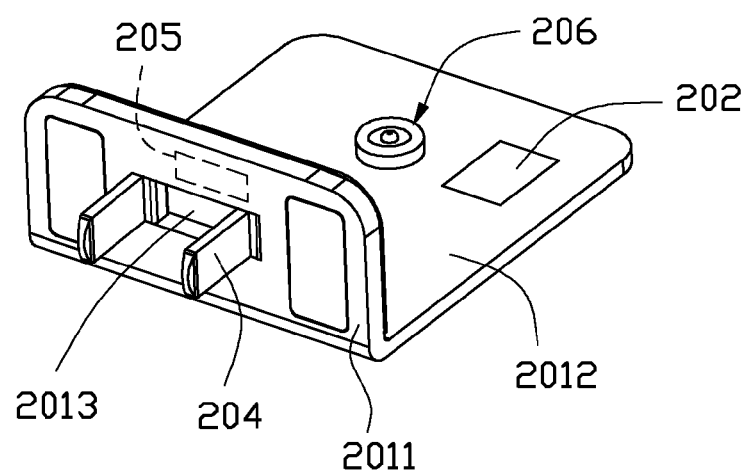
Figure 9:
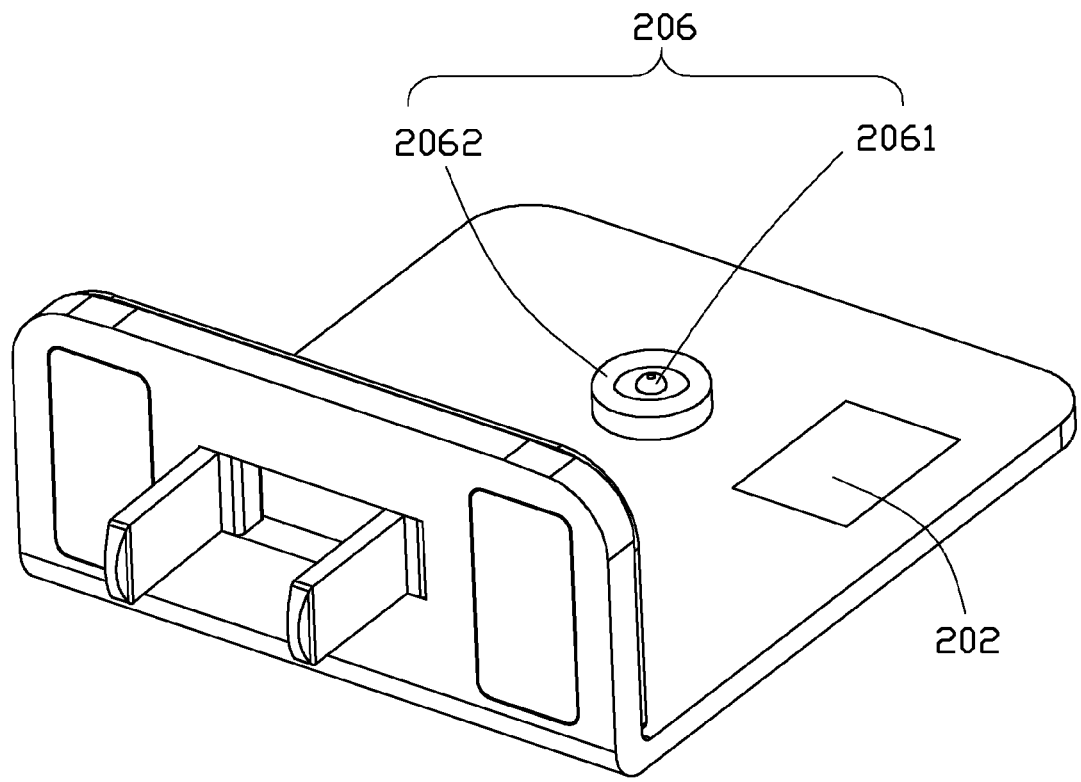
FIG. 9 is a schematic view of the holder of FIG. 8.
Figure 10:
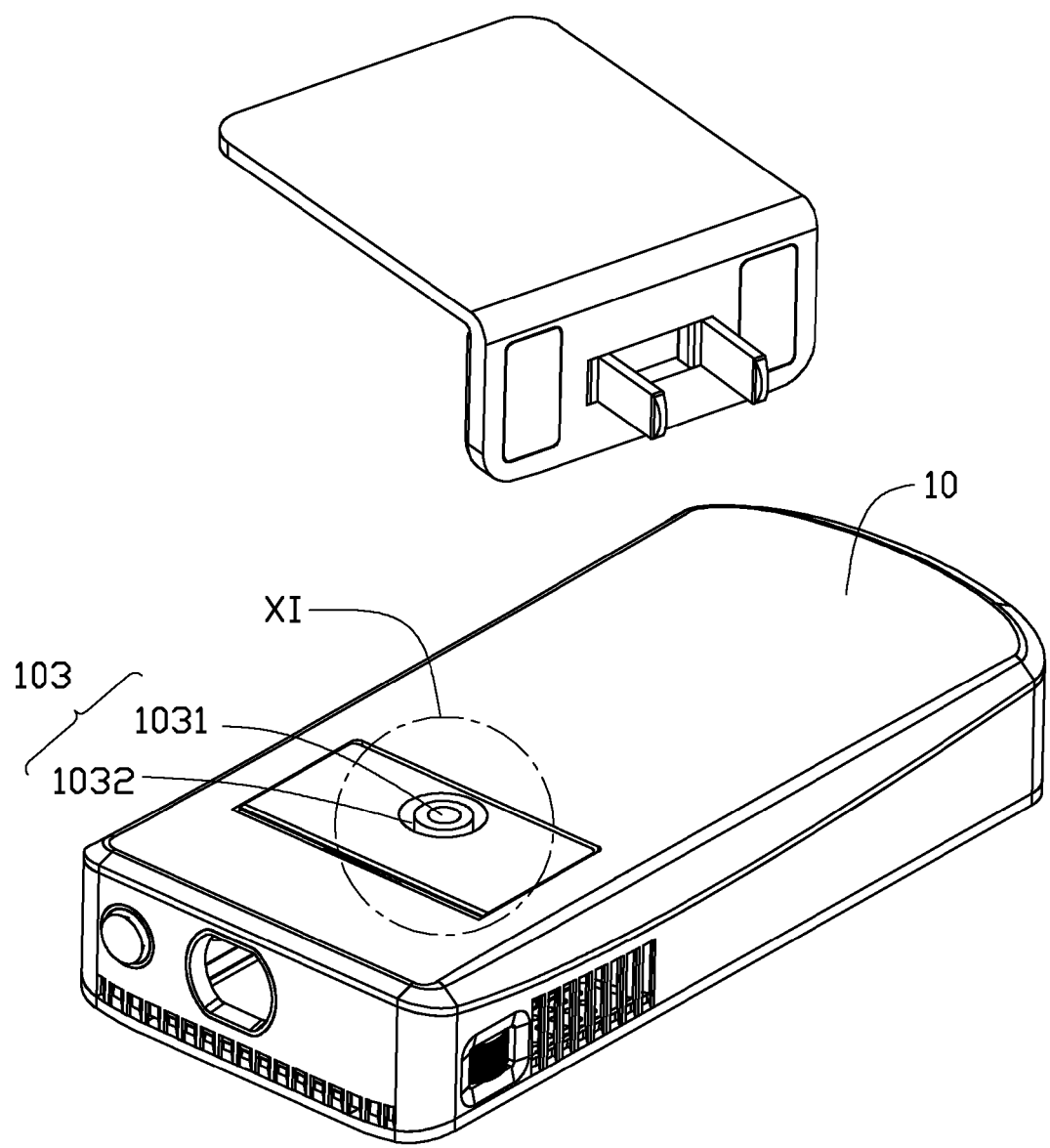
FIG. 10 is similar to FIG. 8, but viewed from another perspective.
Figure 11:
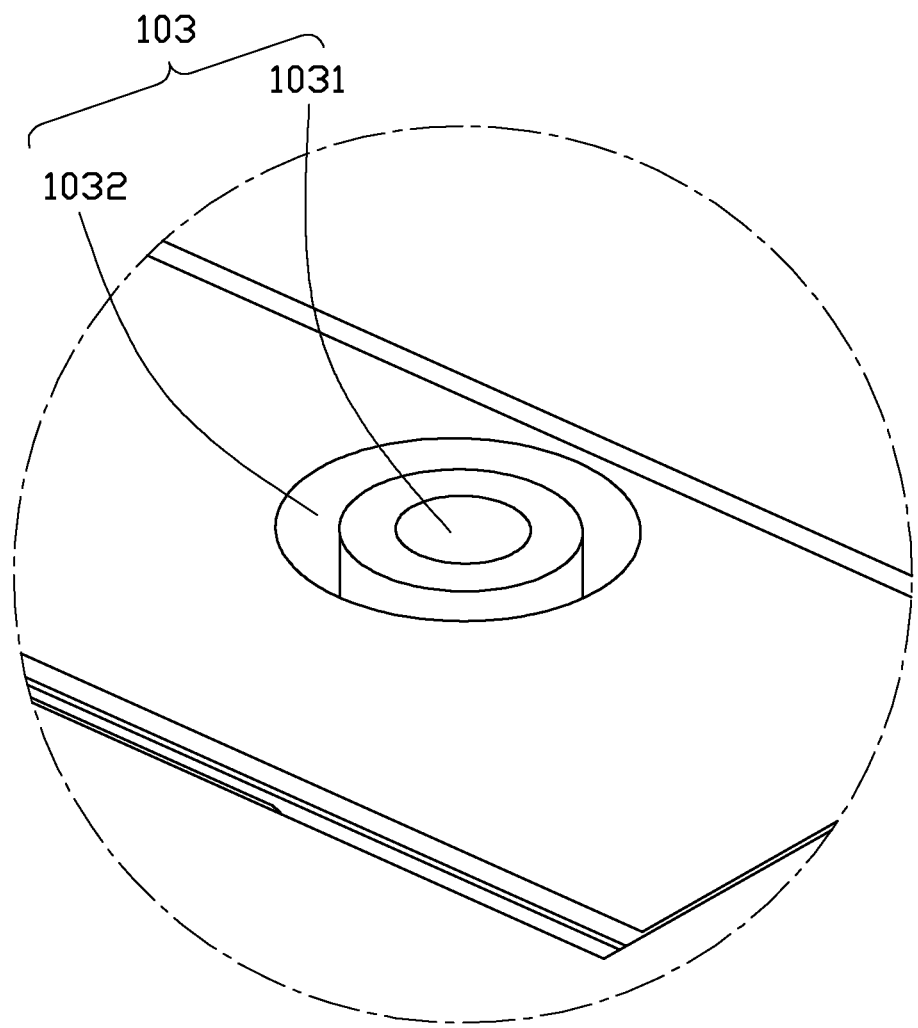
FIG. 11 is an enlarged view of a portion XI of FIG. 10.

Referring to FIG. 6, in a second situation, the base board 2011 of the support 201 is magnetically attracted to a vertical surface 40, such as a vertical iron wall. The projector 10 can be rotated on a horizontal plane defined by the supporting board 2012 to adjust aim.

Referring to FIGS. 7-11, in another embodiment, the projector 10 further includes a plug 204 protruding from a blind hole 2013 of the base board 2011. A circuit 205 is embedded in the base board 2011 and a round contact 206 is arranged on the supporting board 2012. The circuit 205 is electrically connected to the plug 204 and the round contact 206 and can convert the electricity transmitted from the plug 204 into a suitable form for the projector 10. A port 103 is formed in the projector 10 to fit the round contact 206 therein.

When the projector 10 is magnetically attracted to the supporting board 2012 through the first magnet 202, the round contact 206 is rotatably received in the port 103. The projector 10 can rotate about the round contact 206 and can be powered via the electrical connection between the port 103 and the round contact 206. The projector 10 can be rotated to adjust aim.

The round contact 206 includes a central projection 2061 and a first ring 2062. The central projection 2061 is arranged at the center of the first ring 2062. The polarities of the projection 2061 and the first ring 2062 are positive and negative. The port 103 includes a receiving hole 1031 and a second ring 1032. The receiving hole 1031 can receive and contact the central projection 2061, and the second ring 1032 can surround and contact the periphery of the first ring 2062, thereby making an electrical connection. Electrical power can then be transmitted to the projector 10.

Figure 12:
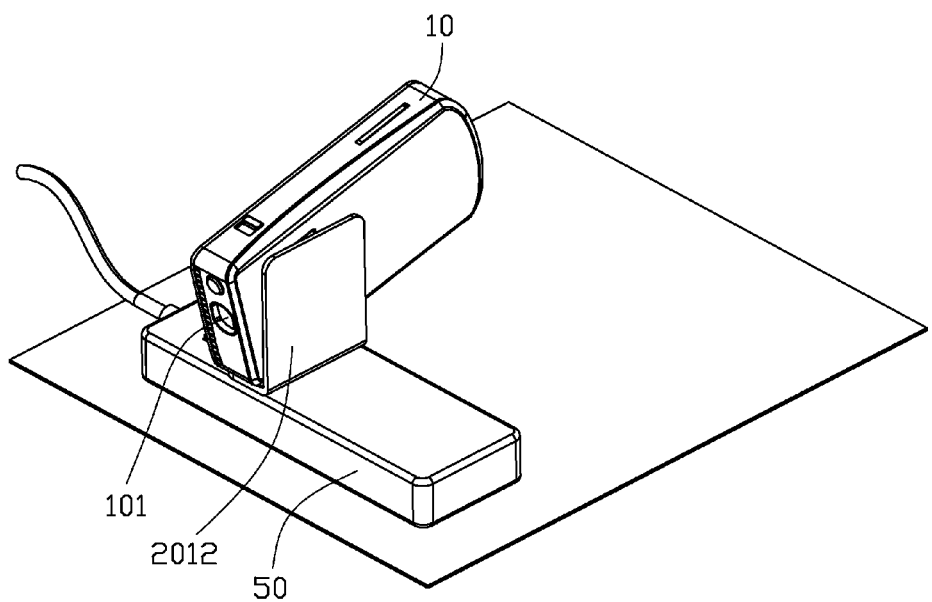
FIG. 12 is a schematic view showing the projector system of FIG. 7 in a use state.

Referring to FIG. 12, when the plug 204 is electrically connected to a power socket 50, power from the plug 204 is converted by the circuit 205 and transferred to the projector 10. In order to make the projector 10 rotate with respect to the supporting board 2012 easily, the shape of the first magnet 202 may be any shape that allows such rotation, and may be arranged between the central projection 2061 and the first ring 2062.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A holder to hold a projector, one side of the projector being capable of being attracted by a magnet, and a port being formed in the projector, the holder comprising:
 a support comprising
  a base board and a supporting board connected to the base board, the base board to be supported by a supporting surface;
 a first magnet fixed on the supporting board to attract the side of the projector, for adjustably and magnetically supporting the projector on the supporting board;
 a plug protruded from the base board;
 a round contact arranged on the supporting board to fit in the port, and the projector being magnetically attracted to the supporting board through the first magnet, the round contact being rotatably received in the port; and
 a circuit embedded in the base board and electrically connected to the plug and the round contact capable of converting the electricity from the plug into a suitable form for the projector.

2. The holder as described in claim 1, further comprising a second magnet fixed on one side of the base board that is away from the supporting board, and the second magnet causes the base board to be magnetically attracted to the supporting surface.

3. The holder as described in claim 1, further comprising two second magnets fixed on two ends of one side of the base board that is away from the supporting board, and the second magnets cause the base board to be magnetically attracted to the supporting surface.

4. The holder as described in claim 1, wherein the round contact comprises a central projection and a first ring, the central projection is arranged at the center of the first ring, the polarities of the central projection and the ring are positive and negative, the port comprises a receiving hole and a second ring, the receiving hole is capable of receiving and contacting the central projection, and the second ring is capable of surrounding and contacting the periphery of the first ring.

5. The holder as described in claim 4, wherein the first magnet is arranged between the central projection and the first ring.

6. A projector system comprising:
 a projector, one side of the projector being capable of being attracted by a magnet, and a port being formed in the projector; and
 a holder, comprising
  a support, comprising
   a base board and a supporting board, the base board to be supported by a supporting surface;
  a first magnet fixed on the supporting board to attract the side of the projector, for adjustably and magnetically supporting the projector on the supporting board;
  a plug protruded from the base board;
  a round contact arranged on the supporting board to fit in the port, and the projector being magnetically attracted to the supporting board through the first magnet, the round contact being rotatably received in the port; and
  a circuit embedded in the base board and electrically connected to the plug and the round contact capable of converting the electricity from the plug into a suitable form for the projector.

7. The projector system as described in claim 6, wherein the round contact comprises a central projection and a first ring, the central projection is arranged at the center of the first ring, the polarities of the central projection and the ring are positive and negative, the port comprises a receiving hole and a second ring, the receiving hole is capable of receiving and contacting the central projection, and the second ring is capable of surrounding and contacting the periphery of the first ring.

8. The projector system as described in claim 7, wherein the first magnet is arranged between the central projection and the first ring.

9. The projector system as described in claim 6, further comprising a second magnet fixed on one side of the base board away from the supporting board, wherein the second magnet causes the base board to be magnetically attracted to the supporting surface.

10. The projector system as described in claim 6, further comprising two second magnets fixed on two ends of one side of the base board away from the supporting board, wherein the second magnets cause the base board to be magnetically attracted to the supporting surface.

* * * * *